United States Patent [19]

Ryan et al.

[11] Patent Number: 4,679,749
[45] Date of Patent: Jul. 14, 1987

[54] AUXILIARY AIRPLANE SEATS

[75] Inventors: James M. Ryan; Arthur H. Gilmore, both of New York, N.Y.

[73] Assignee: Falcon Jet Corporation, Teterboro, N.J.

[21] Appl. No.: 655,526

[22] Filed: Sep. 28, 1984

[51] Int. Cl.[4] .............................................. B64D 11/06
[52] U.S. Cl. .................................. 244/122 R; 297/15; 297/147
[58] Field of Search ............... 244/122 R; 297/14, 15, 297/147; 296/66

[56] References Cited

U.S. PATENT DOCUMENTS

| | | | |
|---|---|---|---|
| 619,154 | 2/1899 | Egan et al. | 297/15 |
| 841,135 | 1/1907 | Finch | 297/15 |
| 954,222 | 4/1910 | Stow | 297/14 |
| 1,180,340 | 4/1916 | Thomas . | |
| 1,412,367 | 4/1922 | Noack . | |
| 1,464,352 | 8/1923 | Cox . | |
| 1,465,529 | 8/1923 | Rumbaugh et al. . | |
| 1,617,901 | 2/1927 | Freise . | |
| 1,698,036 | 1/1929 | Trammell . | |
| 1,723,511 | 8/1929 | Johnston . | |
| 1,761,673 | 6/1930 | Laursen . | |
| 1,784,390 | 12/1930 | Rice . | |
| 2,497,412 | 2/1950 | Larin . | |
| 2,523,960 | 9/1950 | Liljengren et al. . | |
| 3,202,453 | 8/1965 | Richards | 296/66 |
| 3,594,037 | 7/1971 | Sherman . | |

Primary Examiner—Galen Barefoot
Attorney, Agent, or Firm—Morgan & Finnegan

[57] ABSTRACT

There is disclosed auxiliary airplane seats which include a containment unit or housing having located therein a vertically movable seat back member provided on each side with a linkage including a guide pin which is guided in a guide located on the back panel of the containment unit. A seat bottom member provided on each side with a member having a slot which forms a track and which is movable vertically and horizontally is also disposed in the containment unit. The seat bottom member is guided on pins located on the side panels of the containment unit or housing and which pins are disposed in the slots of the members provided on the sides of the seat bottom of the track is also disposed in the containment unit. The vertical movement of the back member and vertical and horizontal movement of the seat bottom member may be assisted by a ring reel provided with a cable attached to the back member and to the ring reel.

12 Claims, 4 Drawing Figures

AUXILIARY AIRPLANE SEATS

BACKGROUND OF THE INVENTION

This invention relates to airplane seats. More particularly, the invention relates to auxiliary airplane seats, that is kibitzer seats, embodying in combination unique structural features. It is to be understood, however, that while the auxiliary seats of this invention, for the sake of simplicity, are disclosed herein as they apply to airplanes, such auxiliary seats may also be utilized in other types of vehicles, such as automobiles, vans, trains and buses and the like, as well as in ships and other water-based vehicles and even in stationery structures, such as offices and rooms in homes and other types of buildings and the like.

The need for auxiliary type of seats, such as kibitzer seats, in order to accomodate additional passengers in moving vehicles on land, in water and in the air, as well as structural dwellings, such as houses, offices and apartments and other building structures has lead to research and development efforts which have resulted in a wide variety of such items over a long period of time. Exempletive of early efforts in this area of development is U.S. Pat. No. 1,180,340 which discloses an auxiliary seat having separately hinged back and seat bottom members which in their tucked, or folded, position are disposed in the side wall of an automobile body. On the other hand, U.S. Pat. Nos. 1,412,367, 1,464,352, 1,465,529, 1,617,901, 1,698,036, 1,723,511, 1,761,673 and 1,784,390 disclose a variety of disappearing furniture structures such as wall seats, chairs, tables and other folding structures, such as ironing boards and the like, which are built into the wall of a stationery structure such as the wall of a room in a house or office, or the like.

In contrast to the above-mentioned patents, U.S. Pat. No. 2,497,412 discloses a longitudinal locker cabinet provided with a plurality of doors each of which has disposed thereon a folding chair, the doors forming a component part of each chair when they are in open position, the structure being particularly adapted to be used on board a ship.

Still further, U.S. Pat. No. 2,523,960 discloses a double seat construction having foldable backs for use in airplanes, as well as other vehicles, and which is hingedly connected to the wall of an airplane or other vehicle, being foldable against the vehicle wall when the backs are folded down against the seat bottoms and the lower frame portions of such seat structures being provided with cargo hold down means or fittings that are exposed in operative position when the seat is in stored position. Finally, U.S. Pat. No. 3,594,037 discloses a wall-mounted compact thin profile cabin attendant seat which folds automatically when an occupant using the same arises, the seat housing an extensible headrest, tilting backrest and forwardly moving seat bottom frame all interlinked for simultaneous movement.

While the above-described seat structures have enjoyed varying degrees of acceptability and success in their various uses, their still exists a need for improved auxiliary seating structures, particularly in the aviation industry. The present invention fulfills this need.

BRIEF STATEMENT OF THE INVENTION

In accordance with the invention and the broad aspects thereof, there is provided an auxiliary airplane seat comprising in combination a containment unit including a bottom member, a substantially vertical, upwardly extending rear panel, at least two vertical, upwardly extending side panels and a vertical, upwardly extending front panel attached to the bottom member and forming a housing, a pair of spaced, parallel guide means located on the rear panel, guiding means disposed on each of the side panels, a substantially vertically movable seat back member provided with linking means including guide pins adapted to cooperate with the guide means located on the rear panel disposed in the containment unit adjacent the rear panel, a substantially vertically upwardly and horizontally movable seat bottom member disposed in the containment unit in front of the seat back member including a pair of slotted track means located along the sides thereof which are pivotally connected to the linking means of the seat back member and the guiding means on the side panels disposed in the slots of the track means, whereby the seat back moves substantially vertically upwardly in the containment unit when the seat bottom is moved substantially vertically upwardly and horizontally and the track means thereof and guided on the guiding means disposed in the slots of the track means.

In an alternative aspect of the invention there is provided auxiliary airplane seats disposed in a side-by-side relationship and comprising in combination a containment unit including a bottom member, a substantially vertical, upwardly extending rear panel, a pair of vertical upwardly extending side panels and a vertical, upwardly extending front panel attached to said bottom member and forming a housing, a substantially vertical, upwardly extending middle panel attached to said bottom member dividing the containment unit into two sections, a pair of spaced, parallel guide means located on the rear panel in each of the sections, guiding means disposed on each of the side panels and on both sides of the middle panel, a pair of substantially vertically movable seat back members provided with linking means including guide pins adapted to cooperate with the guide means located on the rear panel, disposed in each section of the containment unit adjacent the rear panel, a pair of substantially vertically upwardly and horizontally movable seat bottom members disposed in each section of the containment unit in front of the seat back members, including a pair of slotted track means located along the sites of each seat bottom member and which are pivotally connected to the linking means of each of the seat back members and the guiding means on the side panels and the middle panel disposed in the slots of the track means, whereby each of the seat backs moves substantially vertically upwardly in each of the sections of the containment unit when each of the seat bottoms is moved substantially vertically upwardly and horizontally and the track means thereof are guided on the guiding means disposed in the slots of the track means.

DESCRIPTION OF THE DRAWINGS

In order to understand the invention more fully, reference is directed to the accompanying Drawings which are to be taken in conjunction with the detailed description of the invention set forth below and in which Drawings.

DESCRIPTION OF THE PREFERRED EMBODIMENTS

Figure 1:
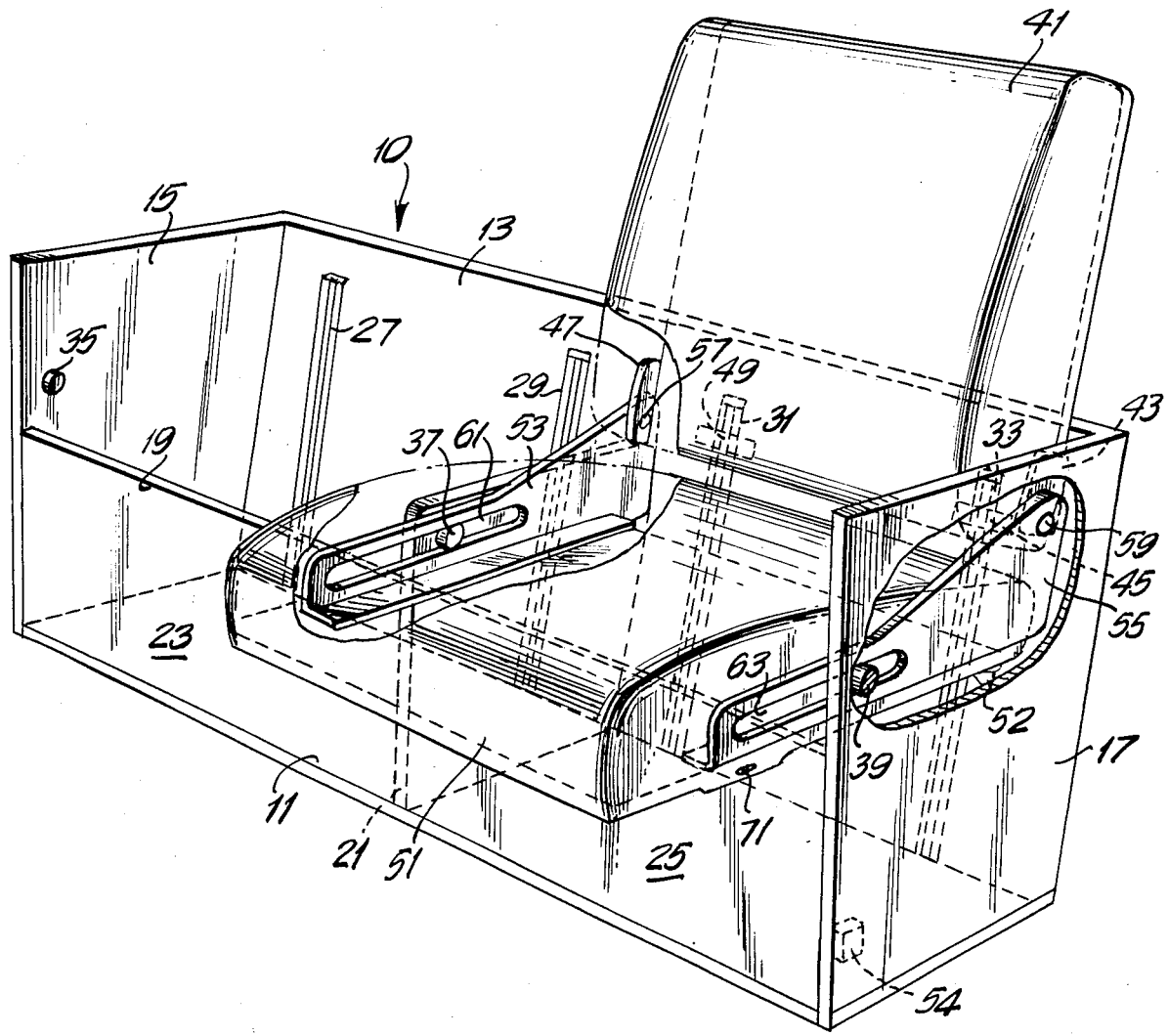
FIG. 1 is a view in prospective and partially in section of an auxiliary airplane seat according to the invention showing a containment unit or housing capable of accomodating two auxiliary seats with one seat including the associated linkages therefor disposed in the containment unit or housing.

Turning now more particularly to FIG. 1, auxiliary airplane seats in accordance with the invention include a containment unit, generally designated by numeral 10, having a bottom member 11, a substantially vertical, upwardly extending rear panel 13, two vertical upwardly extending side panels 15 and 17 and a vertical, upwardly extending front panel 19, all attached to the bottom member 11, thus forming a housing. It is to be noted that the front panel 19 as shown in FIG. 1 does not extend upwardly as high as the rear and side panels and acts as a support for a seat bottom member disposed in the containment unit, as explained more fully hereinafter, when the seat bottom member is opened to a fully horizontal position for use. In this respect, it is to be noted that front panel 19 may extend upwardly to the full height of the side and rear panels along its marginal edges and in which case it will be cut away as needed to form an undercut portion or opening (not shown) to accommodate a seat bottom member.

Now, as shown in FIG. 1, the containment unit 10 forming the housing may be made to a convenient length so that it may accomodate two seats, and when so made, it also includes a middle panel 21 attached to bottom member 11, dividing the containment unit into two sections 23 and 25. It is to be understood, however, that it is within the purview of this invention that the containment unit may be made conveniently long to accommodate a plurality of seats and in such cases additional panels like middle panel 21 may then be utilized to divide the unit into additional sections. In such cases, each additional section will also be equipped with the various elements set forth herein for sections 23 and 25.

Spaced parallel channels 27, 29, 31 and 33 are located on the rear panel 13, two of such channels being disposed in each of sections 23 and 25.

Guide pins 35, 37 and 39 are located on the side and middle panels. A similar guide pin (not shown) is also located on the opposite side of the middle panel opposite guide pin 37.

Containment unit 10 and the associated elements thereof are made from metallic materials, such as strong, light-guage steel or aluminum, or alloys thereof.

Figure 2:
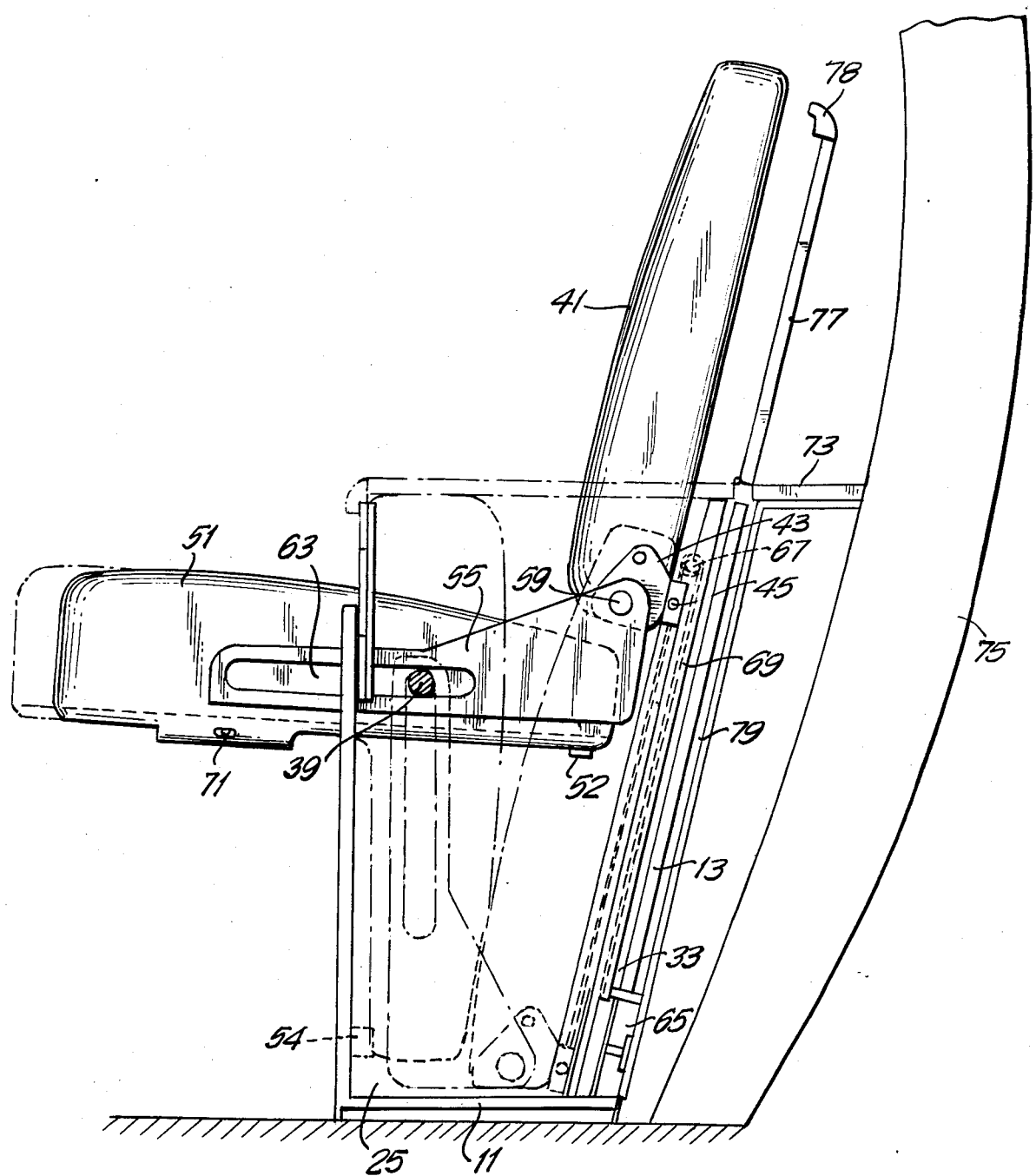
FIG. 2 is a side view in elevation and partially in section of the containment unit shown in FIG. 1 illustrating in more detail the arrangement of the seat back member in an upward vertical position and seat bottom member in upward vertical and horizontal positions, respectively, in solid lines and in tucked positions in broken lines and the linkages and elements associated therewith, including the counter and hinged panel through which forms a top panel for the containment unit or housing.

Referring now to FIGS. 1 and 2, a substantially vertically movable seat back member 41 is located in its tucked position, as shown in broken lines, in section 25 of the containment unit 10. A linking means 43, including a guide pin 45, is located on one side and near the bottom of member 41 and, as may be seen in FIG. 1, a similar linking means 47 and guide pin 49 are also fixed to member 41 on the opposite side. The guide pins are disposed in the above described channels and move substantially vertically therein as the back member 41 is lowered or raised into or out of the containment unit 10.

A substantially vertically and horizontally movable seat bottom member 51 is located, in its tucked position, as shown in broken lines in FIG. 2, in section 25 of the containment unit 10 in front of seat back member 41. A pair of slotted tracks 53 and 55, or brackets, are attached to the sides of member 51 and pivotally connected to back member 41 by pins 57 and 59 connected to linking means 43 and 47 disposed on the back member. The slots 61 and 63 of tracks 53 and 55 are disposed over guide pins 37 and 39, respectively, located on side panel 17 and middle panel 21 and thus guide the seat bottom member 51 vertically and horizontally from its tucked position, as shown in FIG. 2 in dotted lines to its fully open horizontal position ready for use while at the same time causing back member 41 to simultaneously raise from its tucked position to its fully open position. It will be appreciated that slots 61 and 63 of tracks 53 and 55, respectively, are conveniently sized so that they permit sufficient vertical and horizontal movement of seat bottom 51 to full horizontal disposition.

Referring now once again to FIG. 2, it is to be noted that channel 33 has a spring-tensioned ring reel 65 located at its lower end and a pulley 67 located near its upper end. A cable 69 attached to the ring reel 65 passes over pulley 67 and is attached to guide pin 45 on seat back member 41. When seat back member 41 and seat bottom member 51 are in their tucked or closed positions, as shown in FIG. 2, cable 69 is in its extended position and under tension exerted thereon by ring reel 65. Consequently, when an individual commences to raise the seat bottom vertically and horizontally to an open position and the back member commences to rise vertically, the tension exerted by the ring reel on the cable assists his efforts and the cable tends to pull the back member upwardly as it is taken up on the ring reel in response to the tension exerted thereon by that device. It will be appreciated that a like ring reel and the associated elements thereof can also be located at the bottom of channel 31, if desired.

A suitable latch release mechanism 71 is located on the bottom of seat bottom member 51 for locking the seat in an open or closed position and is adapted to cooperate by means of a cable (not shown) or the like with latch 52 located on the trailing edge of the seat bottom member and latch retaining mechanism 54 located on the lower portion of front panel 19. A like mechanism 56 is disposed on side panel 17 to lock the seat bottom when it is in open position.

It will be appreciated that in accordance with this invention containment unit 10 may be provided with two more sections, like section 23 and 25 and the additional sections will each be equipped with the above-described seat structure, including its associated elements.

Auxiliary airplane seats in accordance with this invention also include a counter 73 associated therewith which is located along the side wall 75 of an airplane fuselage just under the level of the windows. The containment unit, including the seat, is located or stored under the counter when in closed position.

Figure 3:
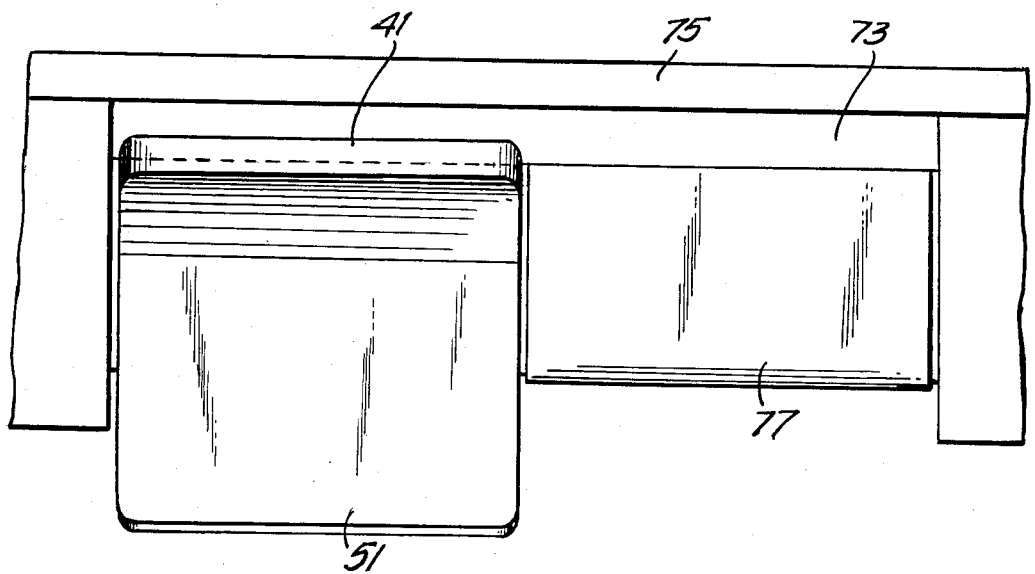
FIG. 3 is a plan view of the auxiliary seats of the invention showing their dispositions in an airplane fuselage, one seat being in open position and the other being in closed position and covered with the hinged top panels of the counter located along the fuselage.
Figure 4:
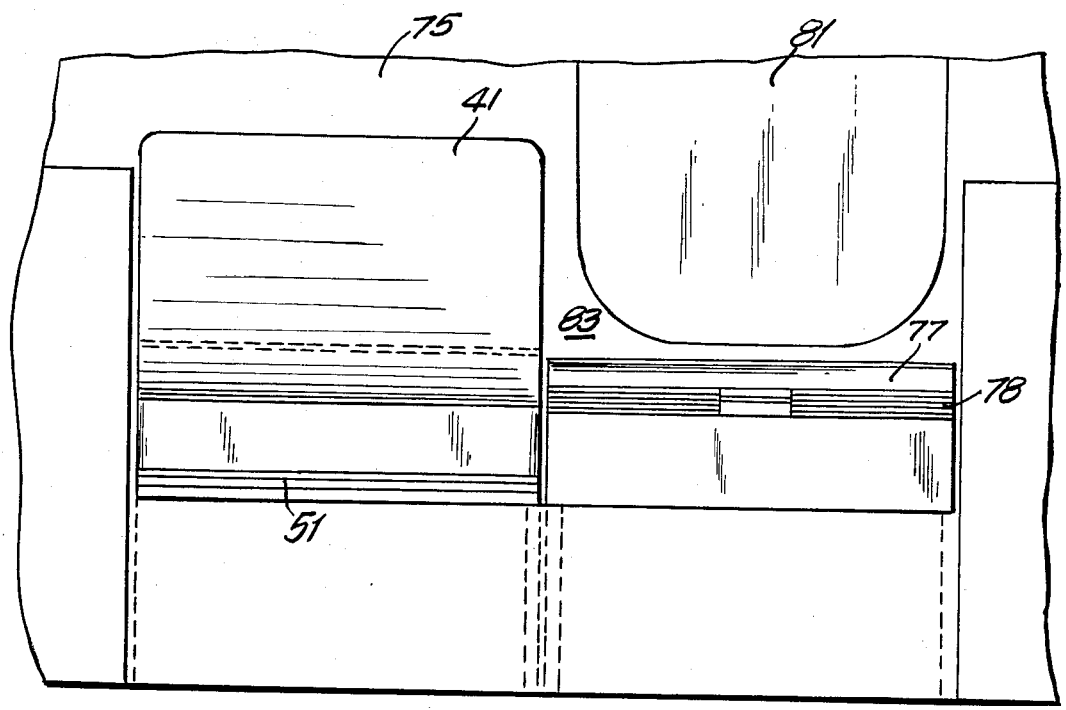
FIG. 4 is a view in elevation of the auxiliary seats shown in FIG. 3 with the closed seat being shown located below the emergency exit of the airplane fuselage.

Counter 73 is provided with one or more hinged panels, such as panel 77, provided with a lip 78 along its leading edge and which is shown in open position in FIG. 2 and closed position FIGS. 3 and 4. When the seat is in open position panel 77 is stored in a channel 79, formed by the rear panel 13 of containment unit 10 and side wall 75 of the fuselage.

Due to its compact construction, containment unit 10 is sufficiently low so that it can be stored under counter 73 when the seat is in closed position and may even be located under window 81 of the emergency exit 83 of an aircraft as shown in FIG. 4.

The auxiliary airplane seats of this invention may be provided with a wide variety of aesthetic acoutrements. For example, the seat back member and set bottom member may be provided with a wide variety of light-weight and comfortable padding, either of foam material or fabric material or other types of padding and, in their complete assembly, may be covered with a wide variety of decorative fabrics to provide a pleasing aesthetic appearance, as well as to coordinate the seats in terms of color or shade with the overall color scheme of an aircraft interial in which the seats are employed. In addition, the side and front panels of the containment unit, as well as the counter, which may be made of the metallic materials mentioned above from which the containment unit is constructed, or from wood, may also be provided with wood veneer or decorative fabric finishes to provide a pleasing aesthetic appearance.

Still further, auxiliary airplane seats in accordance with this invention may be equipped with seat belts (not shown) which may be attached thereto in any convenient manner in order to meet required government safety regulations and the containment unit, as located under the counter associated therewith, may be removably fixed to the aircraft fuselage in any convenient manner so that it is solidly supported and held in place.

Auxiliary airplane seats according to this invention, due to their unique combination of structural elements provide numerous advantages. For example, due to the unique environment in which they are used, the seat structures must satisfy government regulations involving aircraft safety, and, in addition, must meet relatively rigid weight and space guidelines in order to provide satisfactory economical operation of an airplane in which they are used, while, at the same time, providing maximum passenger comfort and convenience. They are advantageous in these respects since they are made, in part, of light-weight metallic materials, such as high strength aluminum and light guage steel or alloys thereof which will meet stringent requirements for safety by the government in aircraft and all of which materials are available through normal commercial channels.

Still further, the auxiliary airplane seats of this invention are advantageous in that they are readily adaptable to a wide variety of aesthetic effects and they employ a wide variety of readily commercially available paddings and fabric coverings to achieve such effects.

At the same time, the auxiliary airplane seats of this invention provide maximum convenience and comfort to a passenger employing the seat.

Still further, the auxiliary airplane seats of this invention are advantageous in that they are compact structurally and amenable to being located in a wide vareity of areas of an aircraft fuselage while at the same time occupying a minimum amount of space. Numerous other advantages of the auxiliary airplane seats of this invention will be readily apparent to those skilled in the art.

It is to be understood that this invention, in its broader aspects is not to be limited to the specific embodiments shown and described but departure may be made therefrom within the scope of the appended claims without departing from the principles of the invention and without sacrificing the chief advantages thereof.

What is claimed is:

1. An auxiliary airplane seat comprising in combination a containment unit including a bottom member, a substantially vertical, upwardly extending rear panel, at least two vertical, upwardly extending side panels and a vertical, upwardly extending front panel attached to said bottom member and forming a housing, a pair of spaced, parallel guide means located on said rear panel, guiding means disposed on each of said side panels, a substantially vertically movable seat back member provided with linking means including guide pins adapted to cooperate with the guide means located on said rear panel disposed in said containment unit adjacent said rear panel, a substantially vertically upwardly and horizontally movable seat bottom member disposed in said containment unit in front of said seat back member including a pair of slotted track means located along the sides thereof which are pivotally connected to the linking means of said seat back member and the guiding means on said side panels disposed in the slots of said track means, whereby said seat back moves substantially vertically upwardly in said containment unit when said seat bottom is moved substantially vertically upwardly and horizontally and the track means located along the sides of said seat bottom member, slide past and pivot about said guiding means on said side panels which are disposed in the slots of said track means.

2. An auxiliary airplane seat according to claim 1 in which at least one of the spaced, parallel guide means on the rear panel is provided at its lower end with a spring-tensioned ring reel, a pulley located near its upper end and a cable attached to said ring reel passing over said pulley and attached to the guide pin on the linkage provided on the seat back member, whereby the upward vertical movement of said seat back member and the upward and horizontal movement of the seat bottom member is assisted.

3. An auxiliary airplane seat according to claim 1 having a counter associated therewith, such counter being located along the fuselage wall of an airplane and under which the containment unit, including said seat, is stored when in closed position.

4. An auxiliary airplane seat according to claim 1 having a counter associated therewith, such counter being located along the fuselage wall of an airplane and under which the containment unit, including the seat, is stored when in closed position, said counter being provided with a hinged panel forming a top panel for said containment unit and being stored, when said seat is in an open position, in a channel formed by the rear panel of said containment unit and the fuselage wall of said airplane.

5. An auxiliary airplane seat according to claim 1 including a latch release mechanism located on the bottom of the seat bottom member for locking said seat in closed position or in open position.

6. An auxiliary airplane seat comprising in combination a containment unit including a bottom member, a substantially vertical, upwardly extending rear panel, at least two vertical, upwardly extending side panels and a vertical, upwardly extending front panel attached to said bottom member and forming a housing, a pair of spaced, parallel channels located on said rear panel, guide pins disposed on each of said side panels, a substantially vertical movable seat back member disposed in said containment unit adjacent said rear panel, said seat back member provided with linking means, including guide pins, located on the sides and near the bottom thereof, said guide pins being disposed in said spaced parallel channels and being substantially vertically, upwardly movable therein, a substantially vertically and horizontally movable seat bottom member disposed in said containment unit in front of said seat back member and including a pair of slotted track means located along the sides thereof and pivotally connected near the bottom thereof to the linking means of said seat back member and having the guide pins located on said side panels disposed in the slots thereof, at least one of the spaced, parallel channels located on said rear panel being provided at its lower end with a spring-tensioned ring reel, a pulley located near its upper end, a cable attached to said ring reel passing over said pulley and attached to the guide pin on the linkage of said seat back member and disposed in said channel, a latch release mechanism located on the bottom of said seat bottom for locking said seat in closed and open positions, a counter including a hinged panel located along the wall of an airplane fuselage under which said containment unit, including said seat, is stored when in closed position, said hinged panel forming a top panel for said containment unit, and the rear panel of said containment unit and said fuselage wall forming a channel in which said hinged panel is stored when said seat is in an open position.

7. Auxiliary airplane seats disposed in a side-by-side relationship comprising in combination a containment unit including a bottom member, a substantially vertical, upwardly extending rear panel, a pair of vertical upwardly extending side panels and a vertical, upwardly extending middle panel attached to said bottom member dividing said containment unit into two sections, a pair of spaced, parallel guide means located on said rear panel in each of said sections, guiding means disposed on each of said side panels and on both sides of said middle panel, a substantially vertically movable seat back member provided with linking means including guide pins adapted to cooperate with the guide means located on said rear panel disposed in each section of said containment unit adjacent said rear panel, a substantially vertically upwardly and horizontally movable seat bottom member disposed in each section of said containment unit in front of the seat back member located in each section of said containment unit and each seat bottom member including a pair of slotted track means located along the sides thereof and pivotally connected to the linking means of each seat back member and the guiding means on the side panels and middle panel disposed in the slots of said track means, whereby each seat back moves substantially vertically upwardly in each of the sections of said containment unit when each seat bottom is moved substantially vertically upwardly and horizontally and the track means located along the sides of each seat bottom member slide past and pivot about the guiding means disposed on each of said side panels and on both sides of said middle panel which are disposed in the slots of said track means of each seat bottom member.

8. Auxiliary airplane seats according to claim 7 in which at least one of the spaced, parallel guide means on the rear panel of each section of the containment unit is provided at its lower end with a spring-tensioned ring reel, a pulley located near its upper end and a cable attached to said ring reel passing over said pulley and attached to the guide pins on the linkage provided on the seat back member disposed in each section, whereby the upward vertical movement of said seat back member and the upward and horizontal movement of the seat bottom member in each section is assisted.

9. Auxiliary airplane seats according to claim 7 having a counter associated therewith, said counter being located along the fuselage wall of an airplane and under which the containment unit including the seats is stored when in closed position.

10. Auxiliary airplane seats according to claim 7 having a counter associated therewith, said counter being located along the fuselage wall of an airplane and under which the containment unit, including the seats, is stored when in closed position, said counter being provided with a pair of hinged panels, each panel forming a top panel for each section of said containment unit and being stored, when said seats are in an open position, in channels formed by the rear panel of said containment unit and the fuselage wall of said airplane.

11. Auxiliary airplane seats according to claim 7 including a latch release mechanism located on the bottom of each seat bottom member located in each section of the containment unit for locking said seats in closed positions and open positions.

12. Auxiliary airplane seats disposed in a side-by-side relationship comprising in combination a containment unit including a bottom member, a substantially vertical, upwardly extending rear panel, a pair of vertical upwardly extending side panels and a vertical, upwardly extending front panel attached to said bottom member and forming a housing, a substantially vertical, upwardly extending middle panel attached to said bottom member dividing said containment unit into two sections, a pair of spaced, parallel channels located on said rear panel in each of said sections, guide pins disposed on each of said side panels and on both sides of said middle panel, a substantially vertically movable seat back member provided with linking means including guide pins, located on the sides and near the bottom thereof, disposed in each section of said containment unit adjacent said rear panel, said guide pins being disposed in the spaced parallel channels of each of said sections and being substantially vertically upwardly movable therein, a substantially upwardly and horizontally movable seat bottom member disposed in each section of said containment unit in front of the seat back member located in each section of the containment unit, each seat bottom member including a pair of track means located along the sides thereof and being pivotally connected to the linking means of each seat back member and the guide pins on the side panels and said middle panel being disposed in the slots of said track means of each seat bottom member, at least one of the spaced, parallel channels located on said rear panel in each of the sections of said containment unit being provided at its lower end with a spring-tensioned ring reel and a pulley located near its upper end, a cable attached to said ring reel passing over said pulley and attached to the guide pin on the linkage of said seat back member and disposed in said channel, a latch release mechanism located on the bottom of the seat bottom disposed in each of said sections of said containment unit for locking said seats in closed and open positions, a counter including a pair of hinged panels located along the wall of an airplane fuselage under which said containment unit, including said seats, is stored when in closed position, each panel of said pair forming a top panel for each section of said containment unit and being stored, when said seats are in an open position, in channels formed by the rear panel of said containment unit and the fuselage wall of said airplane.

* * * * *